W. A. CARPENTER.
SCRAPER.
APPLICATION FILED MAR. 31, 1917.
1,260,325.
Patented Mar. 26, 1918.
5 SHEETS—SHEET 1.
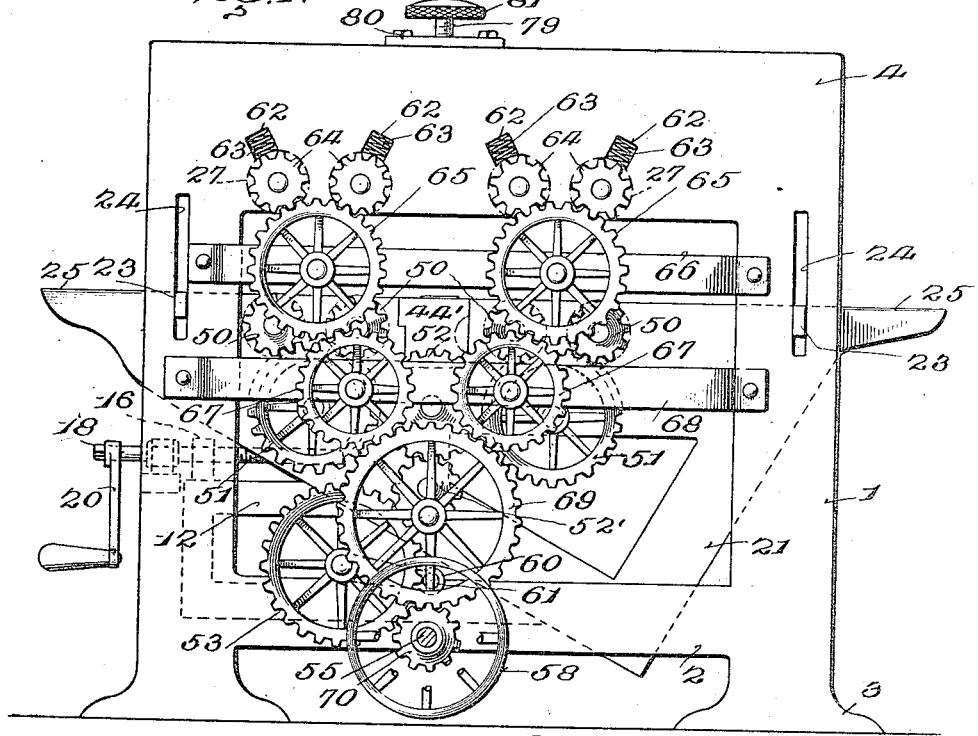
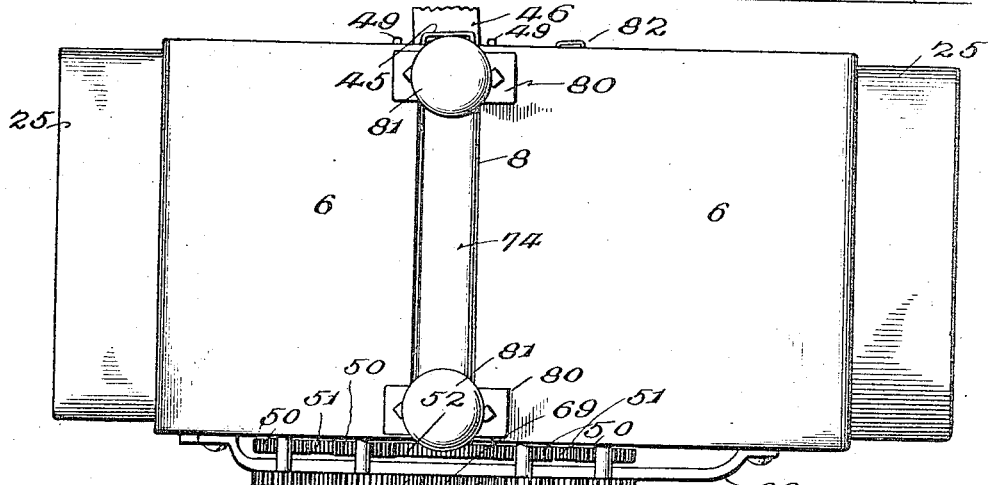
Inventor
W. A. Carpenter W. A. CARPENTER.
SCRAPER.
APPLICATION FILED MAR. 31, 1917.
1,260,325.
Patented Mar. 26, 1918.
5 SHEETS—SHEET 2.
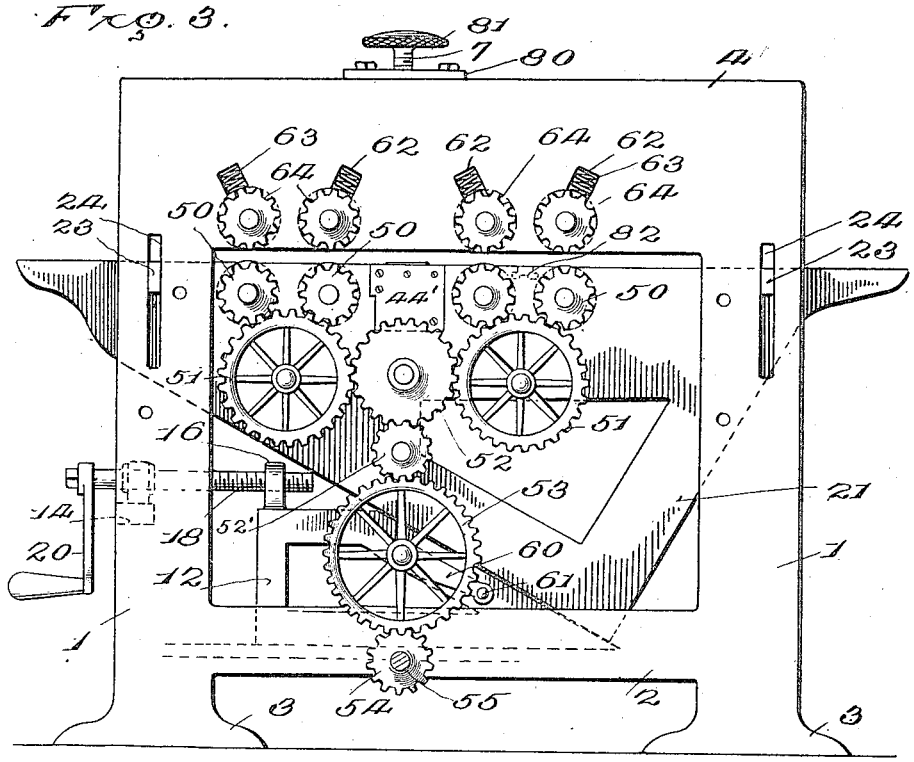
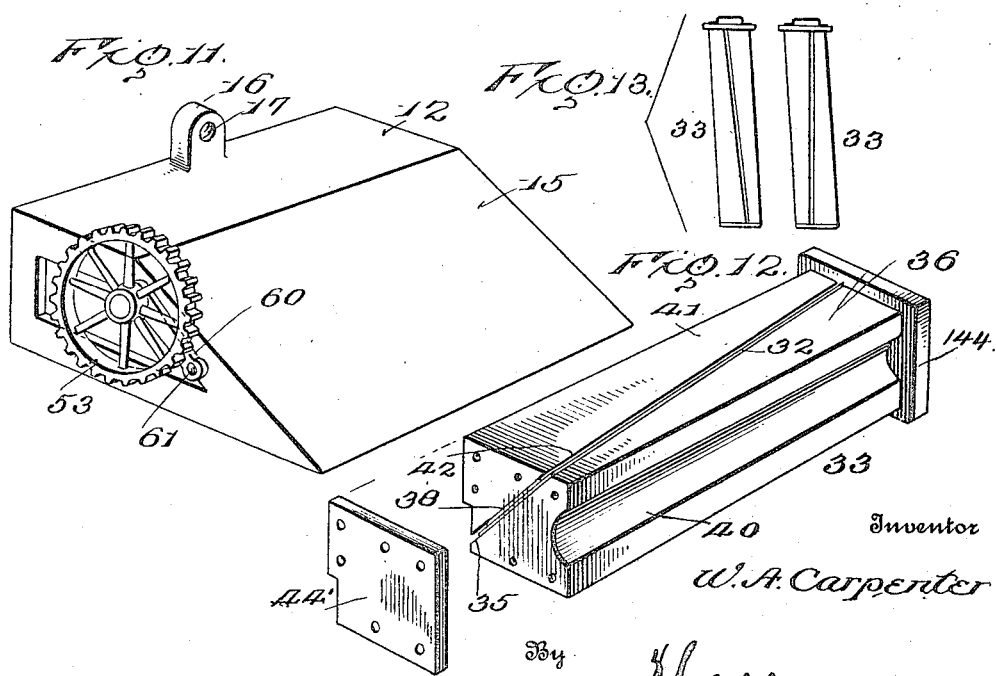
Inventor
W. A. Carpenter
By
Attorneys

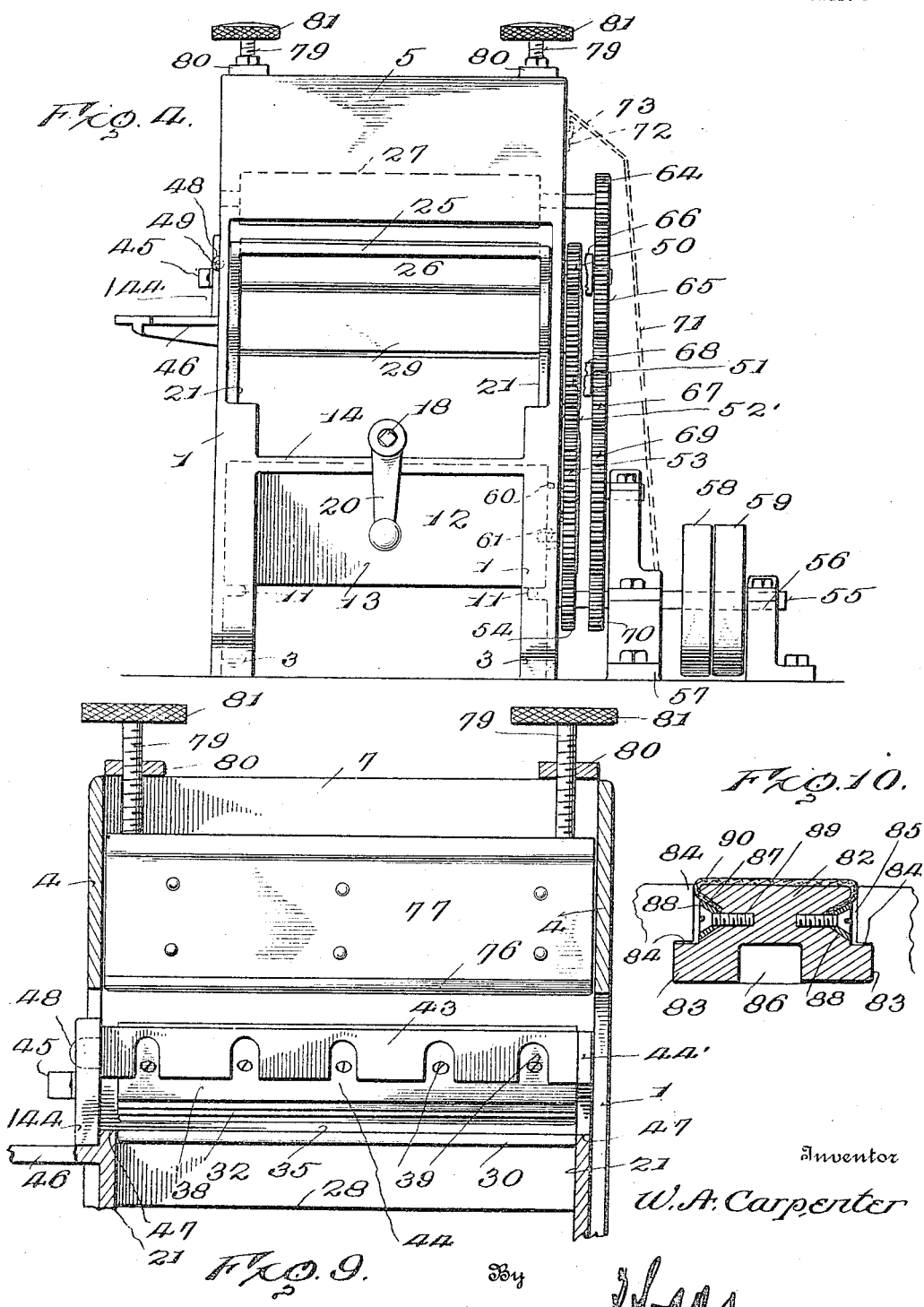

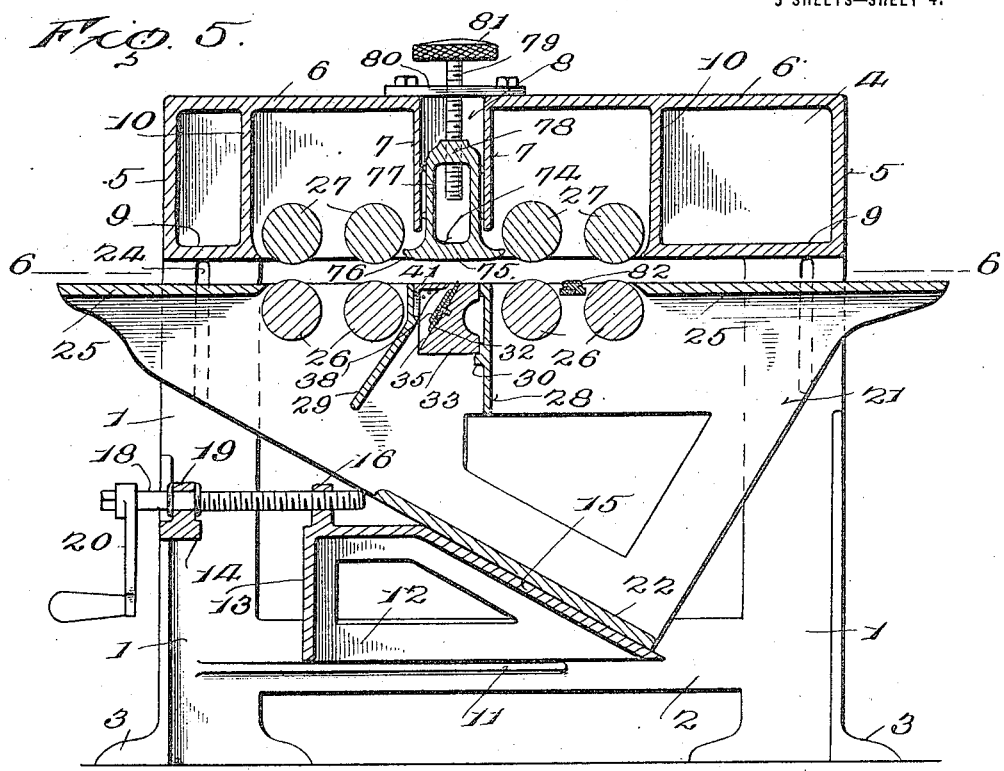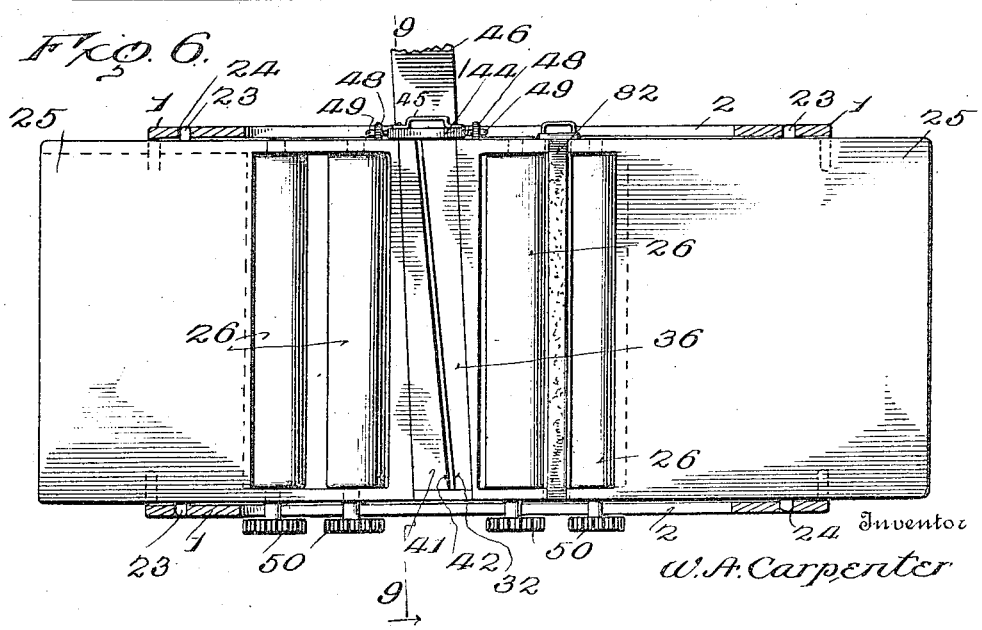

W. A. CARPENTER.
SCRAPER.
APPLICATION FILED MAR. 31, 1917.

1,260,325.

Patented Mar. 26, 1918.
5 SHEETS—SHEET 5.

Inventor
W. A. Carpenter
By
Attorneys

UNITED STATES PATENT OFFICE.

WILLIAM A. CARPENTER, OF GREENVILLE, SOUTH CAROLINA.

SCRAPER.

1,260,325.  Specification of Letters Patent.  Patented Mar. 26, 1918.

Application filed March 31, 1917. Serial No. 158,999.

*To all whom it may concern:*

Be it known that I, WILLIAM A. CARPENTER, a citizen of the United States, residing at Greenville, in the county of Greenville and State of South Carolina, have invented certain new and useful Improvements in Scrapers, of which the following is a specification.

This invention relates to scraping machines and has for its object the provision of a compact and efficient apparatus whereby the surfaces of boards may be given a smooth finish. One object of the invention is to provide a novel means for supporting the scraper blade and for facilitating the insertion of the same into or removal thereof from the machine. Another object of the invention is to provide means whereby the upper and lower feeding rollers will be positively rotated independently and without interfering with the vertical adjustment of the board-supporting table. A further object of the invention is to provide a novel presser bar and also to provide means for finishing the surface of the board after it has been scraped.

In the accompanying drawings:

Figure 1 is a side elevation of my improved machine, parts being broken away so as to disclose the trains of gearing for driving the feeding rollers;

Fig. 2 is a plan view of the machine;

Fig. 3 is a view similar to Fig. 1 but showing the outer train of gearing removed;

Fig. 4 is an end elevation of the machine;

Fig. 5 is a central longitudinal vertical section;

Fig. 6 is a horizontal section taken on the line 6—6 of Fig. 5;

Fig. 9 is an enlarged transverse section on the line 9—9 in Fig. 6;

Fig. 10 is a detail transverse section of the smoothing device;

Fig. 11 is a detail perspective view of the slidable wedge which is utilized to vertically adjust the work support;

Fig. 12 is a detail perspective view of the blade and its support;

Fig. 13 is a diagrammatic plan view of a pair of cutters.

Figure 7:
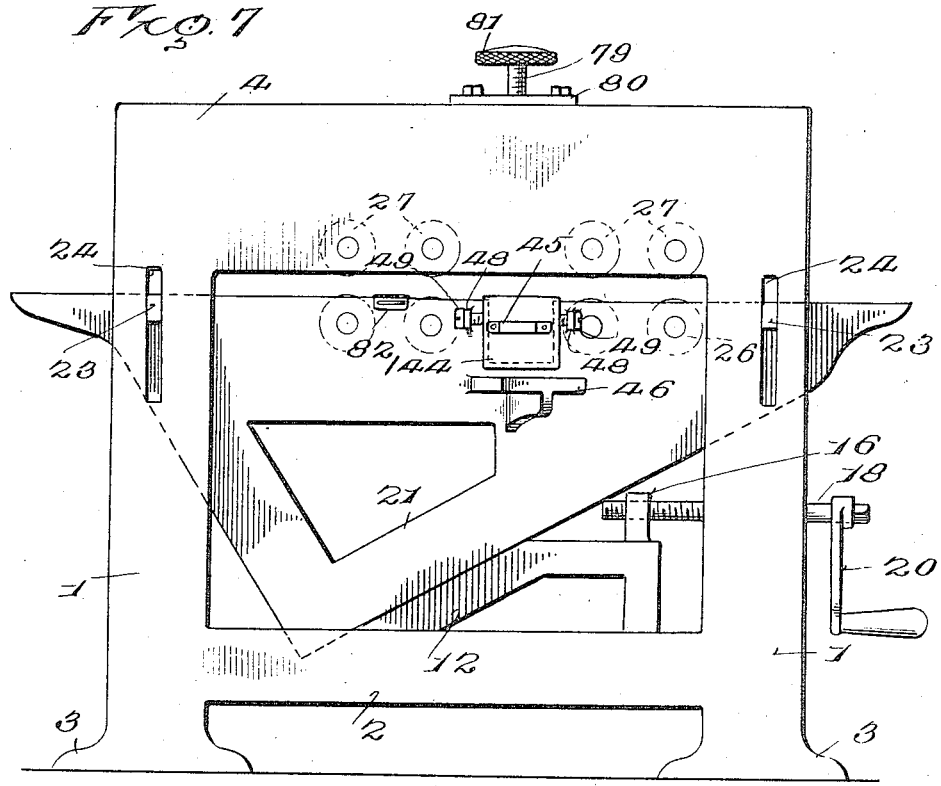
Fig. 7 is a side elevation looking at the side opposite that seen in Fig. 1.

In carrying out my invention, I employ a supporting frame comprising side plates, each consisting of posts or standards 1 connected by beams or braces 2 and provided at their lower ends with laterally enlarged feet 3 whereby a firm support upon the floor of the workroom will be effected. The upper extremities of the posts or standards 1 are connected by side plates 4 and end plates 5, the upper edges of said side and end plates being connected by top plate 6 which extend inwardly from the end plates between the side plates and may be integral therewith. Near a suitable transverse plane of the frame, the top plates 6 are provided with depending parallel webs 7 whereby a chamber 8 is provided to receive the major portion of the presser bar, as will be hereinafter more fully set forth. The end plates 5 have their lower edges disposed in a plane determined by the normal position of the upper surface of the board being passed through the machine and from their lower edges plates 9 extend inwardly so as to form guides for the board as it passes through the machine. The inner edges of the webs or plates 9 are connected with the top plates 6 by transverse webs or walls 10, as shown and as will be readily understood. Upon the inner faces of the beams or brace bars 2, I provide the ribs or cleats 11 which constitute guides or ways upon which the adjusting member 12 is slidably mounted. This adjusting member 12 may be of skeleton formation to reduce the weight and has a transverse web 13 which is adapted to impinge upon a cross bar 14 extending between the posts 1 at one end of the main frame and thereby limit the outward movement of the adjusting body. The inner end of the adjusting body 12 is inclined, as shown at 15, so that a wedge formation is imparted to the body. Upon the top of the said adjusting body, near the outer edge of the same, is a lug or ear 16, the bore 17 of which is threaded to receive and be engaged by an adjusting screw 18 which is swiveled in a bearing 19 on the upper side of the cross bar 14. The outer end of the said adjusting screw 18 is equipped with a handle 20 of any suitable or preferred form whereby it may be manipulated and it will be readily understood that rotation of the screw will cause the lug or ear 16 to move along the screw and, consequently, will adjust the member 12 inwardly or outwardly. The work-supporting and blade-carrying frame consists of the side plates 21 having inclined lower edges which are adapted to rest upon the adjusting body or member 12 and preferably connected by a web 22 so as to give an extended bearing and firm support upon the said body or member. This web 22 will also serve to deflect the shavings dropping from the blade in the operation of the machine and cause the same to be discharged at the forward end of the main frame where they may be easily gathered and will not interfere with the operation of the apparatus. The side plates 21 are provided near their upper edges and near their ends with lateral projections 23 which play in vertical slots or grooves 24 in the posts or standards 1 whereby the said side plates will be permitted vertical movement as well as prevented from longitudinal movement. It will be readily understood that as the adjusting body or member is moved inwardly, the inclined surface 15 of the same will pass under the web or plate 22 and thereby lift the work-supporting and blade-carrying body or frame and that upon reverse movement of the member 12 the frame will be lowered. The side plates 21 are connected at their ends by the horizontal web or plates 25 which serve as a table to support the work and, between the said table plates, feed rollers 26 are mounted in and extend between the side plates 21 while, between the webs 7 and 10, feed rollers 27 are mounted in and extend between the side plates 4 of the main frame. The side plates 21 are further connected intermediate their ends by transverse webs 28 and 29 which are so located as to be approximately in the vertical planes of the webs 7. The webs 28 and 29 diverge at their lower ends and upon their opposed faces are provided with ribs 30 and 31, respectively, which constitute ways or supports for the blade holder or scraper-head.

Figure 8:
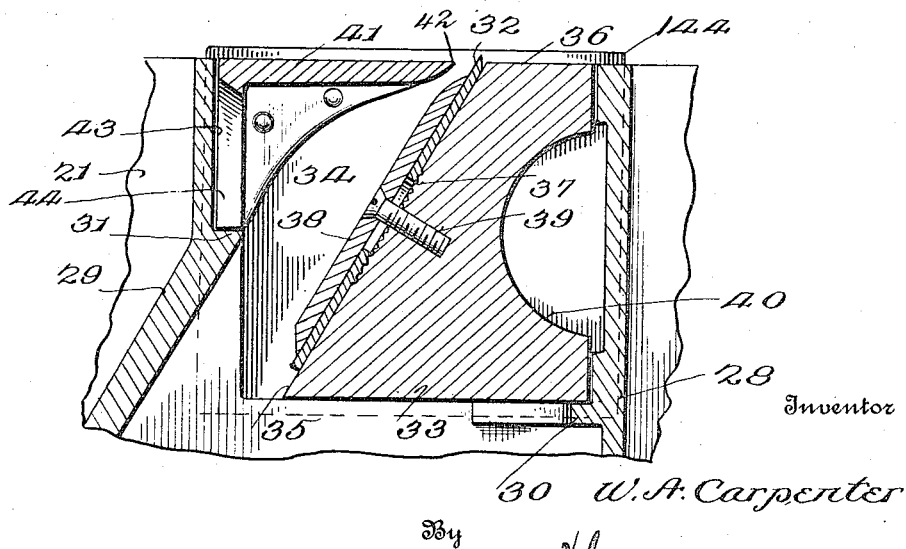
Fig. 8 is a transverse vertical section of the scraper blade and its support.

The blade 32 is carried by a head or block 33 cut away along one side to provide the space 34 and the inclined surface 35. The blade is placed within the space 34 and against the inclined surface 35 with its upper cutting edge extending slightly above the top 36 of the head and the opposed faces of the blade and the head 33 are constructed with corrugations or their equivalents, as shown at 37, Fig. 8, whereby slipping of the blade up and down will be prevented. A holding plate 38 is fitted against the blade 32 and a securing screw 39 is inserted through the said plate and the blade into the head 33 so as to firmly secure the blade in place. The side of the head remote from the space 34 may be grooved or otherwise cut away, as indicated at 40, to avoid unnecessary weight in the head. To guard against injury to the operator from contact with the blade, a plate 41 is fitted to the upper edges of the head and extends longitudinally of the same with its inner edge, as shown at 42, in spaced relation to the cutting edge of the blade. This plate 41 is provided at its outer edge with a depending flange or branch 43, the lower edge of which is adapted to ride upon the rib or way 31, as shown clearly in Fig. 8. The lower rear corner of the head 33 in a similar manner rides upon the way 30 so that the head with the blade thereon may be easily slid transversely into or out of the machine. The blade, as shown in Figs. 8 and 12, is disposed at an angle to both the vertical and the horizontal planes of the head so that it will perform effectual work by coming gradually into contact with the surface to be planed and it will be noted, on reference to Fig. 6, that the scraper head will extend obliquely across the machine so that the travel of the work through the machine will aid in holding the head in the machine and thereby relieve the strain on the set screws. The branch 43 of the plate 41 is provided with a plurality of notches 44 in its lower edge which are adapted to register with the securing bolts 39 and through which a suitable tool may be inserted to engage the said bolts and adjust the same. It will also be readily understood, upon reference to Fig. 8, that the guard consisting of the plate 41 and its branch 43 serve to define a space or opening through which the shavings may pass. The head is provided at one end with a stop 144 so that, when the head is inserted into the work-supporting frame, the said stop by coming into contact with the outer surface of the side plate 21 will limit the insertion of the head and thereby prevent jamming and consequent injury of the parts and, at the same time, properly position the blade for its work. A handle 45 of any preferred construction may be provided at the top end of the head and a lateral bench or rest 46 will be provided upon the work-supporting frame in order to support the head while it is being inserted or withdrawn. It will be readily understood, of course, that suitable openings or recesses, indicated at 47 in Fig. 9, are provided in the upper portions of the side plates 21 to receive the head and upon one side plate, immediately adjacent the said recesses or openings, are formed lugs 48 in which are mounted set screws 49 adapted to bear upon the sides of the stop 144 and thereby hold the head against withdrawal. The stop 144 may, conveniently, be a flange or plate integrally connecting the members 33 and 41 but I have illustrated it as a separate plate secured to said members, its edges, of course, projecting beyond the sides of the members 33 and 41 so as to impinge against the side of the frame as above stated. At the opposite end of the scraper head, its members are held in the proper relation by a connecting plate 44', shown most clearly in Fig. 12.

In actual use, each machine will be supplied with two scraper heads having knives set at different angles, as shown in Fig. 13. These heads may be used interchangeably according to the nature of the material passing through the machine. By passing the work through the machine twice and changing the heads in the interval between the passings, a very smooth finish will be obtained.

The feed rollers 26 are journaled in suitable bearings in the side plates 21 adjacent the upper edges thereof so that the upper portion of their peripheral surfaces will support the work as it passes to and from the blade. The rollers are arranged preferably in pairs, one pair supporting the work as it passes to the scraper and the other pair supporting the work after it leaves the scraper. It will be understood, however, that the rollers may be increased or decreased in numbers, as may be preferred, and that a sufficient number of rollers may be provided to take the place of the tables 25. The journals of the rollers at one side of the machine project beyond the side plate 21 and are equipped with pinions 50 to mesh with gears 51 suitably journaled in the side plates 21 below the respective pairs of pinions 50 and in turn meshing with an idler 52 mounted between them upon the adjacent side plate 21. The idler 52 meshes with an idler 52' in mesh with a gear 53 which, in turn, meshes with a pinion 54 on the driving shaft 55. The driving shaft 55 is journaled in suitable pillars 56—57 firmly secured upon the floor of the workroom and, between the pillars, it is equipped with fast and loose pulleys 58—59 for the application of power from a suitable motor in the usual manner. The gear 53 is journaled in the end of an arm 60 which is pivoted at its opposite end, as shown at 61, to the adjusting member or body 12. When the adjusting body 12 is moved outwardly, the pivotal point 61 will, of course, follow the said movement and the arm 60 and gear 53 will, of course, be likewise moved outwardly. The weight of the gear 53 will cause it to roll around the pinion 54 and, consequently, it will assume a lower position, as shown in Fig. 1, remaining in mesh with the idler 52', however, so that in all positions of the apparatus the rollers 26 will be positively driven. As the adjusting member or body 12 is moved inwardly to effect lifting of the work-supporting frame, the gear 53 will, of course, be carried inwardly and will ride up on the pinion 54 so as to follow the upward movement of the idler 52'.

The upper presser rollers 27 are journaled in bearings which are slidably mounted in slots 62 in the side plates 4 of the main frame and in the said slots are mounted springs 63 which bear upon the journal boxes and serve to yieldably hold the rollers in a lowered position so that the proper engagement with the work will be effected. The journals of the rollers 27 at one side of the machine are extended beyond the adjacent side plate and are equipped with pinions 64, said pinions being in mesh with the gears 65 which are journaled in suitable bearings in a bar or bracket 66 secured upon the side of the main frame and offset therefrom so as to extend over the pinions 50 on the ends of the lower presser rollers. The gears 65 are in turn in mesh with the gears 67 mounted in a bar or bracket 68, similar to the bar or bracket 66, and these gears 67 both mesh with a gear 69 which is driven by a pinion 70 on the driving shaft 55. It will be readily noted that the driving trains for all the presser and feeding rollers are located at one side of the machine so that examination, repairing or lubricating thereof may be very easily effected. To prevent an accumulation of dust and dirt upon the gears, as well as to avoid chance contact with the same by the operators, a hood, indicated in dotted lines at 71 in Fig. 4, is provided to extend over both trains of gearing and this hood is provided at its upper end with hooks or tongues 72 adapted to engage keepers 73 on the side of the main frame.

Within the chamber 8, hereinbefore referred to, is fitted the presser bar 74 which should have a smooth under surface, as shown at 75, and may be provided with extended convex side edges, as shown at 76, so as to facilitate the movement of the work under the bar without any tendency to catch or buckle. The width of the bar should be sufficient to accommodate the extreme angle of the blade. The presser bar is extended upwardly, as shown at 77, to fit between the walls 7 and loosely engage the same so that it may have a vertical movement and at the ends of said upward extension are internally threaded collars 78 which are engaged by adjusting screws 79 mounted in brackets or plates 80 bridging the chamber 8, as shown clearly in Fig. 5. The adjusting screws 79 are provided with milled-heads or other handles 81 at their upper ends to facilitate their manipulation.

Between the side plates 21, in rear of the scraper and preferably between two rollers 26, I provide a polishing or smoothing member which will preferably consist of a transverse bar 82 having longitudinal flanges 83 on its sides to engage under the overhanging shoulders 84 formed in the side plates at the sides of a recess 85 whereby the bar may be slid into or out of position. To reduce its weight, a groove 86 is formed in the under side of the bar, as shown clearly in Fig. 10.

In the sides of the bar, above the flanges 83 are grooves 87 having their walls converging inwardly so as to receive the conical heads 88 of securing bolts or screws 89. A strip of sand paper or similar material 90 has its longitudinal edges folded into the grooves 87 after which the screws 89 are turned home so that their heads 88 will bind against the edges of the strip of polishing material and thereby firmly clamp them in the said grooves. The polishing or smoothing member may be a drum, if desired, but I prefer the construction illustrated in Fig. 10 and specifically described because of the ease with which the polishing material may be renewed and the device inserted or withdrawn from the frame.

The operation of the machine will be readily understood. The handle 20 is manipulated to partly withdraw the adjusting member 12 and permit a slight descent of the work-supporting frame or table. The work is then inserted and the work-supporting frame raised so that the board will be engaged by and between the first feed rollers 26 and 27. The driving shaft 55 is then permitted to rotate and the board will be fed through the machine, its under surface coming in contact with the scraper and the dirt and projections thereon being rapidly thereby removed. As the travel of the board continues, its under surface will be brought against the polishing member 90 and small roughness which may be left by the scraper blade will be thereby removed. It will be readily understood that the adjusting screws 79 are set so as to hold the board to the scraper blade with sufficient force to cause the blade to engage and scrape the surface of the same but will not be set so hard that the progress of the board through the machine will be unduly retarded. The motion of the driving shaft will be transmitted through the described trains of gears to both sets of the feeding rollers and, consequently, the board will be positively fed through the machine.

It will be readily noted that the several parts of my machine are simple in their construction and very compactly arranged. The blade may be readily adjusted to compensate for wear and set so as to properly engage the work. The shavings will pass between the blade and the web 29 of the work-supporting frame and will drop onto the web 22 and be thereby deflected from the machine. The head carrying the blade may be very easily and readily inserted into or withdrawn from the work-supporting frame and when inserted will be positively and firmly supported and held against any tendency to move with the work. The top of the main frame is so constructed as to thoroughly cover the parts below the same and, consequently, dirt and dust cannot collect upon the working parts nor will the operators be subjected to annoyance and the possible unhealthful influence of the dust arising from the work.

Having thus described the invention, what is claimed as new is:

1. In a machine for the purpose set forth, a work-supporting frame provided with downwardly diverging transverse webs having ways on their inner opposed faces, a head slidably engaging said ways, and a scraper carried by said head, the transverse webs depending below the ways and the head.

2. In a machine for the purpose set forth, the combination of a work-supporting frame having openings in its sides at its top, a head insertible through said openings, a blade carried by said head, a stop at one end of the head adapted to engage a side of the frame and limit the insertion of the head, and securing devices mounted upon the frame at the sides of the opening in one side thereof in lateral relation to the head to engage and secure the same.

3. In a machine for the purpose set forth, the combination of a main frame, a work-supporting frame movable vertically therein, a longitudinally movable adjusting member arranged to effect vertical movement of the work-supporting frame, a driving pinion disposed adjacent said adjusting member, gearing on the side of the work-supporting frame, feeding rollers within said frame operatively connected with said gearing, an arm pivotally mounted at one end on the adjusting member, and a gear carried by the opposite end of the said arm and operatively connecting the driving pinion and the train of gearing on the work-supporting frame.

4. In a machine for the purpose set forth, the combination of a main frame, feed rollers mounted in the upper portion of the said frame, a driving shaft, a train of gearing on the side of the frame connecting the driving shaft with said feed rollers, a work-supporting frame movable vertically in the main frame, an adjusting member for effecting vertical movement of the work-supporting frame, feed rollers in said frame to coact with the feed rollers in the main frame, and a train of gearing connecting said feed rollers with the driving shaft and carried partly by the work-supporting frame and partly by the adjusting member.

5. In a machine for the purpose set forth, the combination of side plates, horizontal webs connecting the upper edges of the side plates and terminating in spaced relation intermediate the ends of the side plates, transverse webs depending from the inner ends of said horizontal webs, other transverse webs depending from the outer ends of the horizontal webs and connecting the ends of the side plates, other transverse webs depending from the horizontal webs and connecting the side plates between the end webs and the first-mentioned transverse webs, horizontal webs connecting the lower edges of the side plates and extending between the last-mentioned transverse webs and the end webs, a work-supporting frame mounted between the side plates below said webs, a scraper in said work-supporting frame, and a presser bar mounted between and guided by the first-mentioned transverse webs and having its lower end expanded to project under said webs and hold the work to the scraper.

In testimony whereof I affix my signature.

WILLIAM A. CARPENTER. [L. S.]

Copies of this patent may be obtained for five cents each, by addressing the "Commissioner of Patents, Washington, D. C."